(12) United States Patent
Allen

(10) Patent No.: US 6,893,864 B2
(45) Date of Patent: May 17, 2005

(54) APPARATUS FOR AERATING A PARTICULATE MATERIAL

(75) Inventor: Jan Allen, Shoreline, WA (US)

(73) Assignee: CH2M Hill, Inc., Englewood, CO (US)

( * ) Notice: Subject to any disclaimer, the term of this patent is extended or adjusted under 35 U.S.C. 154(b) by 0 days.

(21) Appl. No.: 10/279,760

(22) Filed: Oct. 23, 2002

(65) Prior Publication Data
US 2004/0082060 A1 Apr. 29, 2004

(51) Int. Cl.$^7$ .............................................. C12M 1/09
(52) U.S. Cl. ..................... 435/296.1; 405/36; 405/39; 405/52
(58) Field of Search ................ 435/296.1; 210/163, 210/164, 170, 299, 901, 920; 405/36, 39, 52

(56) References Cited

U.S. PATENT DOCUMENTS

| | | | |
|---|---|---|---|
| 873,120 A | 12/1907 | Dunstan | |
| 988,667 A | 4/1911 | Schodde | |
| 1,141,678 A | 6/1915 | Bailey | |
| 1,275,222 A | 8/1918 | Chamberlen | |
| 2,324,545 A | 7/1943 | Svirsky | |
| 2,550,401 A | 4/1951 | Boosey | |
| 3,031,826 A | 5/1962 | Brimberg et al. | |
| 3,042,210 A | 7/1962 | Hattori | |
| 3,212,416 A | 10/1965 | Boersma | |
| 3,653,845 A | 4/1972 | Moravec | |
| 3,674,149 A | 7/1972 | Donalson | |
| 4,257,892 A | 3/1981 | Boersma | |
| 4,454,039 A | * 6/1984 | McCoy | 210/164 |
| 4,871,451 A | 10/1989 | Piskula | |
| 4,883,590 A | 11/1989 | Papp | |
| 4,943,100 A | 7/1990 | Emberson | |
| 5,015,371 A | 5/1991 | Webb | |
| 5,419,602 A | 5/1995 | VanHoose | |
| 5,758,462 A | 6/1998 | Finn | 52/302.1 |
| 6,099,613 A | 8/2000 | Allen et al. | 71/9 |
| 6,254,770 B1 | 7/2001 | Remon | 210/63 |

* cited by examiner

Primary Examiner—David A. Redding
(74) Attorney, Agent, or Firm—Swanson & Bratschun LLC

(57) ABSTRACT

An apparatus for forcing airflow through (i.e., aerating) a particulate material consists of a planar bearing surface and a ventilation conduit underlying the planar bearing surface. A plurality of delivery conduits extend between the ventilation conduit and the planar bearing surface with a mouth of the delivery conduits being near the planar bearing surface. A grate, defining a plurality of openings, covers the mouth of each delivery conduit. Each grate has a top surface substantially parallel to the planar bearing surface and positioned at or no more than a select distance below the planar bearing surface. This select distance is close enough to the planar bearing surface to prevent the accumulation of particulate material over the grate as the particulate material is scraped from the planar bearing surface with an implement having a linear edge abutting the planar bearing surface.

12 Claims, 2 Drawing Sheets

APPARATUS FOR AERATING A PARTICULATE MATERIAL

BACKGROUND OF THE INVENTION

1. Technical Field

Figure 1:
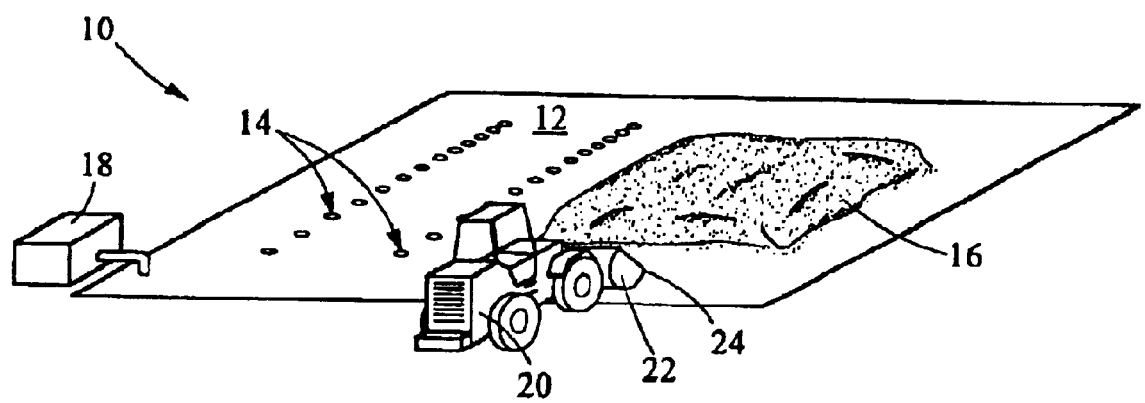
Figure 2:
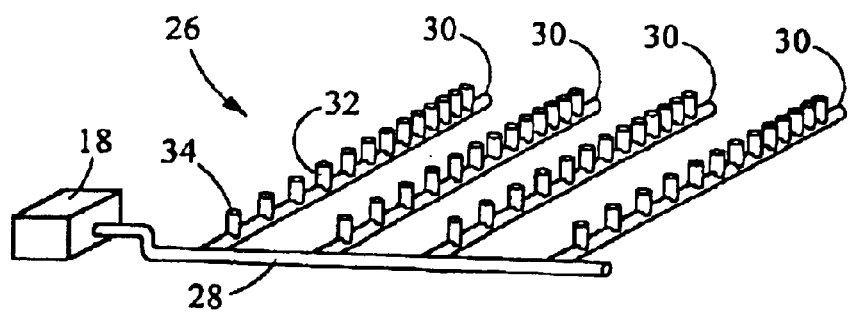

The present invention is directed toward aeration of particulate material, and more particularly toward an apparatus for aerating particulate material such as compost.

2. Background Art

Increasing waste production and decreasing capacity for waste disposal has led to exploration of alternatives for conventional landfilling of waste. The ability to compost organic waste to reduce the volume of waste and produce a usable byproduct has led to expansion of the composting industry.

One known method and apparatus for composting is disclosed in Allen, U.S. Pat. No. 6,099,613 (the "Cedar Grove patent"), the contents of which are incorporated herein in their entirety. The Cedar Grove patent is directed to a composting system and apparatus using pavement as a bearing surface for piles of particulate composting material. A plurality of ventilation conduits underlie the pavement surface and a plurality of delivery conduits extend between the ventilation conduit and the pavement surface to provide aeration to particulate composting material deployed on the pavement surface. The Cedar Grove patent recognizes the need to provide a grate covering the delivery conduits. In order to protect the grate from equipment used to move composting material on the pavement surface, it teaches recessing the grates below the pavement surface about 2–5 inches. It further teaches providing openings in the grates sized to prevent rocks and other debris from entering the delivery conduits.

In practice, debris gets packed into the recess overlying the grates and significantly inhibits the flow of air through the grates, thus diminishing efficient composting. In order to handle denser, wetter feed stocks, the Cedar Grove system requires disposable tees to be installed loosely over each recessed air grate. The cost of the tees as well as the time and effort required to place and replace the tees in the recess increases the cost of this composting system.

Finn, U.S. Pat. No. 5,758,482, is directed to an air floor grating system for use in curing compost. Finn teaches a system having elongate air channels that are covered with elongate grates having a top surface at about the level of a bearing surface of the compost curing system. The grates of the Finn system feature air passages which are intended not to plug under traffic by rubber-tired vehicles used for manipulating the compost. More particularly, the openings of the Finn system features a narrow slot at the top surface which tapers to a wider opening at the bottom of the grate. The design is intended to ensure that compost entering the slot does not plug the opening, but falls through the opening and into the trench below to provide a self-cleaning unit.

The system of Finn relies on easy access to the underlying air channels to provide cleaning and removal of material falling into the air channels through the grates. Another problem with the system of Finn involves accidental displacement of the grates. This allows a large volume of material to enter the air channels and disrupts a uniform air flow. Also, the small slits described in Finn (0.05–0.063 inch at the surface) cannot accommodate high moisture conditions that cause hydraulic swelling of smaller organic matter particles. In addition, the linear system of Finn is subject to non-uniform air flow from one end of an air channel to another in the event of displacement of a grate or varying back pressures caused by non-uniform distribution of composting material over the grates.

The present invention is intended to overcome one or more of the problems discussed above.

SUMMARY OF THE INVENTION

An apparatus for forcing airflow through (i.e., aerating) a particulate material consists of a planar bearing surface and a ventilation conduit underlying the planar bearing surface. A plurality of delivery conduits extend between the ventilation conduit and the planar bearing surface with a mouth of the delivery conduits being near the planar bearing surface. A grate, defining a plurality of openings, covers the mouth of each delivery conduit. Each grate has a top surface substantially parallel to the planar bearing surface and positioned at or no more than a select distance below the planar bearing surface. This select distance is close enough to the planar bearing surface to prevent the accumulation of particulate material over the grate as the particulate material is scraped from the planar bearing surface with an implement having a linear edge abutting the planar bearing surface. The ventilation conduit preferably underlies the planar bearing surface at a depth sufficient to prevent damage to the ventilation conduit as the implement having a linear edge abutting the planar bearing surface moves over the planar bearing surface. The grate openings have a length and a width. The width may be sized so that no more than 50% (by weight) of the particulate material would have a particle size smaller than that measured by a sieve equal to the width of the openings and larger than a 0.08 inch sieve. Each grate preferably includes at least one keeper projecting from a bottom surface of the grate which is received within an inner diameter of an associated delivery conduit to prevent lateral movement of the grate. A pressurized air source is preferably provided in fluid communication with the ventilation conduit. The source may provide a positive or negative air pressure. The ventilation conduit is preferably essentially linear and the plurality of delivery conduits are spaced relative to adjacent delivery conduits along the ventilation conduit at distances that decrease as the delivery conduits are further spaced from the pressurized air source. This distance is chosen so that each delivery conduit delivers air at essentially the same rate with the particulate matter overlying the planar bearing surface at an operative depth. Each grate preferably has a weight sufficient to maintain it in place as the particulate material is scraped from the planar bearing surface with an implement having a linear edge abutting the planar bearing surface. The weight is preferably also sufficient so that the grate remains in place when positive air pressure is applied to the delivery conduits.

Another aspect of the invention is a composting apparatus for composting organic particulate material. The composting apparatus includes a pavement slab having a planar bearing surface. A ventilation conduit underlies the pavement slab. A plurality of delivery conduits extend between the ventilation conduit and the planar bearing surface of the pavement with the mouth of the delivery conduits being near the planar bearing surface. A grate defining a plurality of openings covers the mouth of each delivery conduit. Each grate has a top surface substantially parallel to the planar bearing surface and positioned at no more than a select distance from the planar bearing surface. The select distance is close enough to the planar bearing surface to prevent the accumulation of particulate material over the grate as the particulate material is scraped from the planar bearing surface with an implement having a linear edge abutting the planar bearing surface. Each grating opening has a length and a width. The width is sized so that no more than 50% (by weight) of the particulate material would have a particle size smaller than that measured by a sieve equal to the width of the openings and larger than a 0.08" sieve.

The apparatus for aerating particulate material in accordance with the present invention eliminates the recess over the air grate of the Cedar Grove system and, therefore, enables a more uniform air flow than obtainable using the Cedar Grove system. The system also eliminates the expense and difficulty associated with using tees in the recesses necessitated by the Cedar Grove system in order to maintain uniform air flow. The grate openings are sized to allow material to fall through the grate rather than obstructing the grate. This material may then be removed by vacuuming the conduits or applying a back pressure to the conduits. The system of the present invention provides grates which are securely positioned over the delivery conduits, thus eliminating displacement of the grates which could allow uncontrolled entry of material into the delivery conduits, producing blockage and uneven air flow. The grates are also durable enough to sustain the load of equipment used in moving and treating the compost.

BRIEF DESCRIPTION OF THE DRAWINGS

FIG. 1 is a perspective view of an apparatus for aerating particulate material in accordance with the present invention;

FIG. 2 is a perspective view of the air conveyance system of the apparatus for aerating particulate material of FIG. 1 with the pavement and underlying soil removed;

FIG. 3 is a cross-section of a delivery conduit and grate of the apparatus for aerating particulate material of FIG. 1; and FIG. 4 is a plan view of a grate for aerating particulate material in accordance with the present invention.

DETAILED DESCRIPTION OF THE INVENTION

An apparatus for aerating particulate material 10 of the present invention is illustrated in FIG. 1. The apparatus consists of a pavement slab 12 having a number of rows of vent holes 14 for aerating particulate material 16 deployed on the pavement slab 12. A pressurized air source 18 is in operative association with an air conveyance system 26 which will be discussed below with respect to FIG. 2. The pressurized air source 18 is configured either to provide air under positive pressure or negative pressure (i.e., to create a vacuum at the vent holes 14). The pavement slab 12 and the vent holes 14 are intended to bear material moving equipment 20. The material moving equipment 20 may include a plow or front end loader 22 or other implement having a linear edge 24 abutting a planar bearing surface 38 (shown in FIG. 3) of the pavement slab 12 to allow for manipulation and loading of the particulate material 16.

In a preferred embodiment, the particulate material 16 consists of relatively uniformly sized particles. Representative particles could be materials for compost, biofilter (or soil filter) grains, soil for decontamination and any other particulate matter that it would be useful or desirable to provide a flow of air through.

An air conveyance system 26 for the apparatus for aerating particulate material 10 of the present invention is shown in FIG. 2 with the pavement slab 12 and underlying soil removed for sake of clarity. The air conveyance system 26 consists of a plenum conduit 28 which is in fluid communication with the pressurized air source 18 shown in FIG. 1. A plurality of ventilation conduits 30 extend from the plenum conduit 28 under the pavement slab 12, preferably within a plane parallel to the planar bearing surface 38, shown in FIG. 3, of the pavement slab 12. Each ventilation conduit 30 has a number of delivery conduits 32, each of which has a mouth 34 near the planar bearing surface 38 of the pavement slab 12. As seen in FIG. 2, the delivery conduits 32 are spaced closer to each other toward a distal end of the ventilation conduits 30, or away from the pressurized air source 18. This differential spacing is intended to deliver air at essentially the same rate to the mouth 34 of each delivery conduit 32 so as to provide a relatively even distribution of air to a bed of particulate material 16 deployed on the pavement slab 12 at an operative depth. "Operative depth" means a depth suitable for ventilation by the apparatus for aerating particulate material 10.

FIG. 3 shows in detail the interface between the air conveyance system 26 and the pavement slab 12. The ventilation conduit 30 lies under the pavement slab 12 and a layer of soil 36 at a depth sufficient to protect the ventilation conduit 30 from damage as material moving equipment 20 moves over the pavement slab 12. The delivery conduit 32 can be seen to extend to the ventilation conduit 30 so that its mouth 34 is near the planar bearing surface 38 of the pavement slab 12. A shallow recess 40 in the planar bearing surface 38 of the pavement slab 12 is dimensioned to receive a grate 42 which covers the mouth 34 of the delivery conduit 32. The shallow recess 40 is of a diameter slightly greater than the outer diameter of the delivery conduit 32 to define an annular shoulder 43 on which a circumferential edge of the grate 42 rests. The shallow recess 40 is configured so that a top surface 44 of the grate 42 is substantially parallel to the planar bearing surface 38. As used herein, "substantially parallel to" means that no portion of the top surface 44 of the grate 42 within the shallow recess 40 extends above the planar bearing surface 38 if the top surface 44 of the grate 42 is not truly parallel to the planar bearing surface 38. With the grate 42 deployed in the shallow recess 40, the top surface 44 of the grate 42 is "coplanar" with the planar bearing surface 38 or, as illustrated in FIG. 3, slightly below the planar bearing surface 38. The distance d between the planar bearing surface 38 and the top surface 44 of the grate 42 is preferably small enough that particulate material 16 will not fill the shallow recess 40 above the top surface 44 of the grate 42 when the planar bearing surface 38 is scraped with an implement having a linear edge 24 abutting the planar bearing surface 38, such as the material moving equipment 20 illustrated in FIG. 1. Preferably, the distance d is no greater than ⅛ inch for most particulate material.

The grate 42 has a plurality of keepers 46 which extend in an axial direction beyond a back surface of the grate 42. The keepers 46 are radially spaced to engage an inner diameter of the delivery conduit 32 so as to prevent lateral displacement of the grate 42 within the mouth 34. The grate 42 may be made of any of the following materials: steel alloy, aluminum, fiberglass reinforced plastic (FRP) or rubber. Preferably, the grate 42 will be made of cast steel or aluminum alloy for greater bearing strength, as material moving equipment 20 manipulating the particulate material 16 may weigh 80,000 pounds or more. Use of a metal such as steel or an aluminum alloy also makes the grate 42 heavy enough that it will remain in place over the mouth 34 of the delivery conduit 32 while particulate material 16 is being handled on the planar bearing surface 38. The use of a dense material for the grate 42 also allows it to stay in place under positive air pressure represented by arrow 48 or negative air pressure represented by the arrow 50. In a preferred embodiment, an o-ring 52 made of a dense or closed-cell foam lies between the bottom of the grate 42 and the annular shoulder 43.

Figure 4:
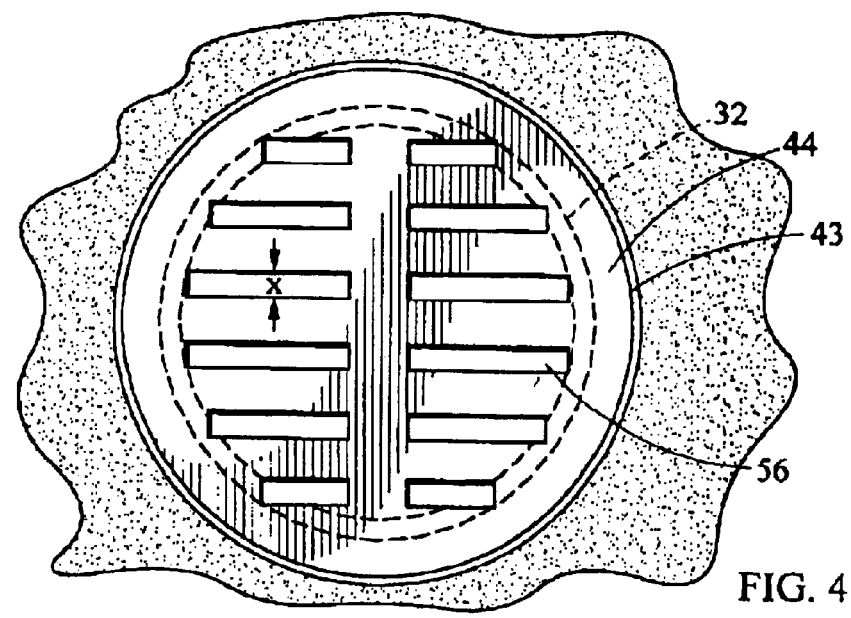

FIG. 4 shows the top surface 44 of the grate 42 in a plan view. The grate 42 has a number of openings 56 having a length and a width x. The width x is selected to be large enough so that particulate material 16 being aerated will not clog the opening 56, but instead small amounts will be able to fall through the openings 56 into the delivery conduit 32. Preferably, the width x is sized so that no more than 50% (by weight) of the particulate material 16 being aerated would have a particle size smaller than that measured by a sieve equal to the width of the opening and larger than a 0.08 inch sieve. Alternatively, the width x is sized so that no more than 60% (by volume) would have a particle size smaller than that measured by a sieve equal to the width of the opening. When cleaning of the air conveyance system 26 to remove particles which have fallen therein is required, the grate 42 may be removed manually and debris blown out the mouth 34 of the delivery conduits 32 by a positive pressure applied to the air conveyance system 26, or a negative pressure can be applied to the air conveyance system 26 to suck out particulate debris.

In a preferred embodiment, the apparatus for aerating particulate material 10 is used for composting organic particulate material or forcing air through a biofilter. In this embodiment, the openings 56 preferably have a width x of greater than 0.25 inch and may be in a range of 0.25–0.75 inch, depending upon the size of the particulate organic material being composted. Other uses for the device could be as a biofilter, an air distribution surface, bioremediation aeration surface for ventilating biopiles, drying manure and sludges, and drying crops. The width of the openings x would vary in each application as necessary to aerate the size particles being treated.

What is claimed is:

1. An apparatus for aerating a particulate material, the apparatus comprising:

a planar bearing surface;

a ventilation conduit underlying the planar bearing surface;

a pressurized air source in fluid communication with the ventilation conduit;

a plurality of delivery conduits extending between the ventilation conduit and the planar bearing surface with a mouth of the delivery conduits being near the planar bearing surface; and a grate defining a plurality of openings covering the mouth of each delivery conduit, each grate having a top surface substantially parallel to the planar bearing surface and positioned at or no more than a select distance below the planar bearing surface, the select distance being close enough to the planar bearing surface to prevent the accumulation of particulate material over the grate as the particulate material is scraped from the bearing surface with an implement having a linear edge abutting the planar bearing surface.

2. The apparatus of claim 1 wherein the ventilation conduit underlies the planar bearing surface at a depth sufficient to prevent damage to the ventilation conduit as the implement having a linear edge abutting the planar bearing surface moves over the planar bearing surface.

3. The apparatus of claim 1 wherein the grate openings have a length and a width, the width being sized so that no more than 50% (by weight) of the particulate material would have a particle size smaller than that measured by a sieve equal to the width of the openings and larger than a 0.08 inch sieve.

4. The apparatus of claim 1 wherein the grate includes at least one keeper projecting opposite the top surface, the keeper being received within an inner diameter of the delivery conduit to prevent lateral movement of the grate.

5. The apparatus of claim 1 further including the ventilation conduit being essentially linear and the plurality of delivery conduits being spaced relative to adjacent delivery conduits along the ventilation conduit at distances that decrease as the delivery conduits are further spaced from the pressurized air source, the distances being chosen so that each delivery conduit delivers air at essentially the same rate with the particulate material overlying the bearing surface at an operative depth.

6. The apparatus of claim 1 wherein the grate has a weight sufficient to maintain it in place as the particulate material is scraped from the planar bearing surface with an implement having a linear edge abutting the planar bearing surface.

7. The apparatus of claim 6 wherein the grate is made of steel or aluminum alloy.

8. The apparatus of claim 1 further comprising an o-ring seal between each grate and the mouth of the delivery conduits.

9. An composting apparatus for composting organic particulate material, the composting apparatus comprising:

a pavement slab having a planar bearing surface;

a ventilation conduit underlying the pavement slab;

a plurality of delivery conduits extending between the ventilation conduit and the planar bearing surface of the pavement with a mouth of the delivery conduits being near the planar bearing surface; and a grate defining a plurality of openings covering the mouth of each delivery conduit, each grate having a top surface substantially parallel to the planar bearing surface and positioned at or no more than a select distance below the planar bearing surface, the select distance being close enough to the planar bearing surface to prevent the accumulation of particulate material over the grate as the particulate material is scraped from the bearing surface with an implement having a linear edge abutting the planar bearing surface, each grating opening having a length and a width, the width being sized so that no more than 50% (by weight) of the particulate material would have a particle size smaller than that measured by a sieve equal to the width of the openings and larger than a 0.08 inch sieve.

10. The apparatus of claim 9 wherein the ventilation conduit underlies the pavement at a depth sufficient to prevent damage to the ventilation conduit the implement having a linear edge abutting the planar bearing surface moves over the planar surface.

11. The apparatus of claim 9 wherein the grate includes at least one keeper projecting opposite the top surface received within an inner diameter of the delivery conduit to prevent lateral movement of the grate.

12. The apparatus of claim 9 further including a source of pressurized air in fluid communication with the ventilation conduit, the ventilation conduit being essentially linear and the plurality of delivery conduits being spaced along the ventilation conduit at distances that decrease as the delivery conduits are further from the source of pressurized air, the distances being chosen so that each delivery conduit delivers air at essentially the same rate with the particulate material overlying the bearing surface at an operative depth.

* * * * *

UNITED STATES PATENT AND TRADEMARK OFFICE
CERTIFICATE OF CORRECTION

| | |
|---|---|
| PATENT NO. | : 6,893,864 B2 |
| DATED | : May 17, 2005 |
| INVENTOR(S) | : Jan Allen |

It is certified that error appears in the above-identified patent and that said Letters Patent is hereby corrected as shown below:

The title page should be deleted and substitute therefore the attached title page as shown on the attached page.

Figure 3:
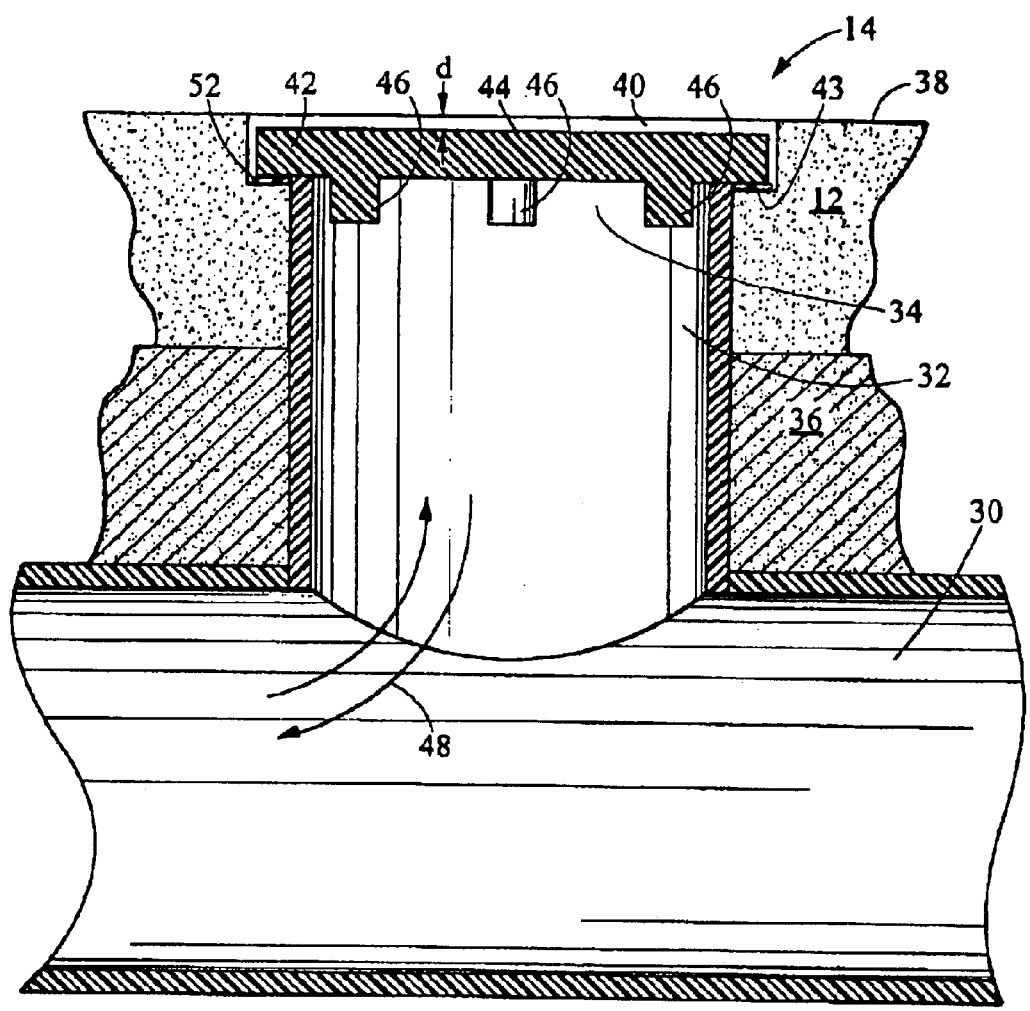

<u>Drawings,</u>
Fig. 3 has been amended so that positive air pressure is indicated by arrow 48 and negative air pressure is indicated by arrow 50, as shown on the attached page.

Signed and Sealed this

Sixteenth Day of August, 2005

JON W. DUDAS
*Director of the United States Patent and Trademark Office*

(12) United States Patent
Allen

(10) Patent No.: US 6,893,864 B2
(45) Date of Patent: May 17, 2005

(54) APPARATUS FOR AERATING A PARTICULATE MATERIAL

(75) Inventor: Jan Allen, Shoreline, WA (US)

(73) Assignee: CH2M Hill, Inc., Englewood, CO (US)

(*) Notice: Subject to any disclaimer, the term of this patent is extended or adjusted under 35 U.S.C. 154(b) by 0 days.

(21) Appl. No.: 10/279,760

(22) Filed: Oct. 23, 2002

(65) Prior Publication Data
US 2004/0082060 A1 Apr. 29, 2004

(51) Int. Cl.⁷ ............................................. C12M 1/09
(52) U.S. Cl. ..................... 435/296.1; 405/36; 405/39; 405/52
(58) Field of Search ................... 435/296.1; 210/163, 210/164, 170, 299, 901, 920; 405/36, 39, 52

(56) References Cited

U.S. PATENT DOCUMENTS

| | | |
|---|---|---|
| 873,120 A | 12/1907 | Dunstan |
| 988,667 A | 4/1911 | Schodde |
| 1,141,678 A | 6/1915 | Bailey |
| 1,275,222 A | 8/1918 | Chamberlen |
| 2,324,545 A | 7/1943 | Svirsky |
| 2,550,401 A | 4/1951 | Boosey |
| 3,031,826 A | 5/1962 | Brimberg et al. |
| 3,042,210 A | 7/1962 | Hattori |
| 3,212,416 A | 10/1965 | Boersma |
| 3,653,845 A | 4/1972 | Moravec |
| 3,674,149 A | 7/1972 | Donalson |
| 4,257,892 A | 3/1981 | Boersma |
| 4,454,039 A * | 6/1984 | McCoy .................... 210/164 |
| 4,871,451 A | 10/1989 | Piskula |
| 4,883,590 A | 11/1989 | Papp |
| 4,943,100 A | 7/1990 | Emberson |
| 5,015,371 A | 5/1991 | Webb |
| 5,419,602 A | 5/1995 | VanHoose |
| 5,758,462 A | 6/1998 | Finn ........................ 52/302.1 |
| 6,099,613 A | 8/2000 | Allen et al. ................... 71/9 |
| 6,254,770 B1 | 7/2001 | Remon ........................ 210/63 |

* cited by examiner

*Primary Examiner*—David A. Redding
(74) *Attorney, Agent, or Firm*—Swanson & Bratschun LLC

(57) ABSTRACT

An apparatus for forcing airflow through (i.e., aerating) a particulate material consists of a planar bearing surface and a ventilation conduit underlying the planar bearing surface. A plurality of delivery conduits extend between the ventilation conduit and the planar bearing surface with a mouth of the delivery conduits being near the planar bearing surface. A grate, defining a plurality of openings, covers the mouth of each delivery conduit. Each grate has a top surface substantially parallel to the planar bearing surface and positioned at or no more than a select distance below the planar bearing surface. This select distance is close enough to the planar bearing surface to prevent the accumulation of particulate material over the grate as the particulate material is scraped from the planar bearing surface with an implement having a linear edge abutting the planar bearing surface.

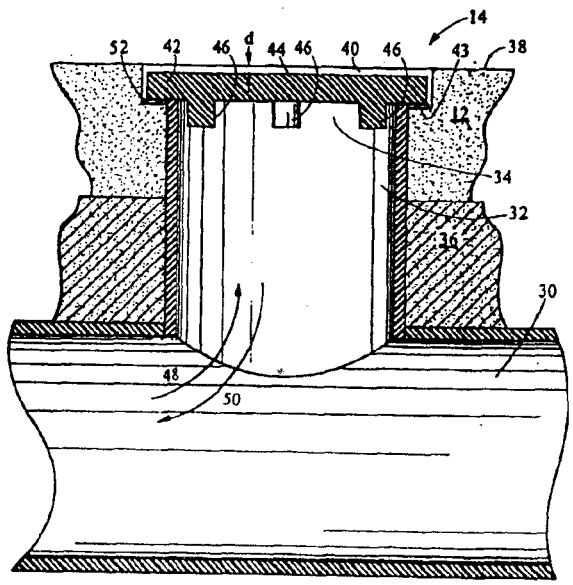

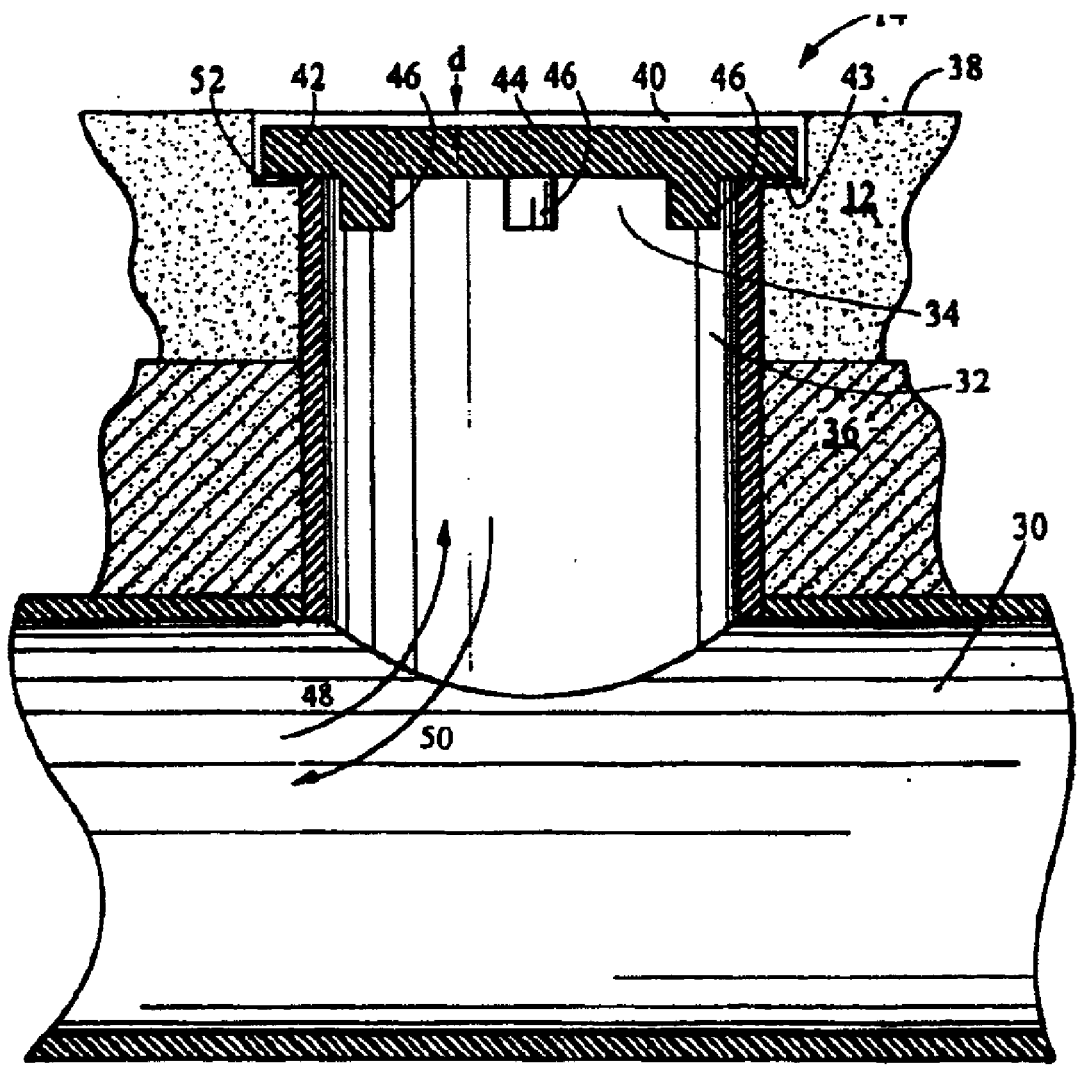

12 Claims, 2 Drawing Sheets